(12) United States Patent
Camp, Jr. et al.

(10) Patent No.: US 8,706,053 B2
(45) Date of Patent: Apr. 22, 2014

(54) COMMUNICATIONS CIRCUITRY FOR AN ELECTRONIC DEVICE

(75) Inventors: William O. Camp, Jr., Chapel Hill, NC (US); David R. Story, Holly Springs, NC (US); Paul Futter, Cary, NC (US); Gerard J. Hayes, Wake Forest, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 348 days.

(21) Appl. No.: 12/621,549

(22) Filed: Nov. 19, 2009

(65) Prior Publication Data
US 2011/0117863 A1 May 19, 2011

(51) Int. Cl.
*H04B 1/40* (2006.01)
*H04B 1/04* (2006.01)

(52) U.S. Cl.
CPC ............... *H04B 1/0458* (2013.01); *H04B 1/40* (2013.01)
USPC .......................................................... 455/77

(58) Field of Classification Search
USPC .......... 455/73, 77, 82, 83, 91, 101, 102, 103, 455/121, 127.3, 192.3, 193.1, 150.1, 226.1, 455/550.1, 114.2, 126
See application file for complete search history.

(56) References Cited

U.S. PATENT DOCUMENTS

| | | | |
|---|---|---|---|
| 6,081,700 A * | 6/2000 | Salvi et al. | 455/193.3 |
| 6,978,126 B1 | 12/2005 | Blaker et al. | |
| 7,474,878 B1 * | 1/2009 | Hietala et al. | 455/126 |
| 8,131,232 B2 * | 3/2012 | Muhammad | 455/114.2 |
| 2008/0090539 A1 * | 4/2008 | Thompson | 455/250.1 |
| 2009/0046030 A1 | 2/2009 | Song et al. | |
| 2010/0273441 A1 * | 10/2010 | Dubash et al. | 455/192.2 |
| 2011/0300812 A1 * | 12/2011 | Camp et al. | 455/77 |

OTHER PUBLICATIONS

Ranta et al, Antenna tuning approach aids cellular handsets, Nov. 2008, Microwaves & RF pp. 82-92.*
International Search Report and Written Opinion from corresponding International Application No. PCT/US10/51584.

* cited by examiner

*Primary Examiner* — David Bilodeau
(74) *Attorney, Agent, or Firm* — Renner, Otto, Boisselle & Sklar, LLP

(57) ABSTRACT

The control of an antenna tuner for a portable electronic device includes closed loop tuning when sufficient transmit power is present. The closed loop tuning commences using a predetermined antenna tuner configuration for an operational band and device state. The closed loop tuning may be constrained by a tuning range associated with the predetermined antenna tuner configuration for the operational band and device state. Also, when transmit power is low or when a transceiver is in a receive only state, open loop tuning may be conducted by placing the antenna tuner in the predetermined (or default) configuration for the operational band and phone state.

12 Claims, 3 Drawing Sheets

COMMUNICATIONS CIRCUITRY FOR AN ELECTRONIC DEVICE

TECHNICAL FIELD OF THE INVENTION

The technology of the present disclosure relates generally to portable electronic devices and, more particularly, to communications circuitry having a dynamically tunable antenna tuner, the communications circuitry used for wireless communications between the electronic device and a communications system.

BACKGROUND

Mobile electronic devices, such as mobile telephones, have radiated performance requirements. For instance, the device may have an expected total radiated power (TRP) and an expected total integrated sensitivity (TIS). But as electronic devices become smaller, these requirements are more difficult to meet. In addition, electronic devices are trending toward supporting communications over a wider range of frequencies and communications protocols, and to use multiple input multiple output (MINO) antenna/transceiver configurations. As such, the need for antenna volume is increasing. Therefore, device form factor and radio performance are competing factors in the design and development of mobile electronic devices.

SUMMARY

To improve the radio performance of mobile electronic devices, the present disclosure describes communications circuitry that includes a controlled antenna tuner. The control of the antenna tuner includes closed loop tuning when sufficient transmit power is present. The closed loop tuning commences using a predetermined antenna tuner configuration for the operational band and device state. The closed loop tuning may be constrained by a tuning range associated with the predetermined antenna tuner configuration for the operational band and device state. The tuning range places an upper limit and a lower limit on the amount of tuning that may occur during the closed loop tuning. Also, when transmit power is low or when a transceiver is in a receive only state, open loop tuning may be conducted by placing the antenna tuner in the predetermined (or default) configuration for the operational band and phone state.

According to one aspect of the disclosure, a communications circuit assembly for an electronic device through which the electronic device establishes wireless communications with a communications network includes a transceiver; an antenna assembly; a tuner that operatively couples the transceiver and the antenna assembly; and a controller configured to control the tuner by outputting tuner control data, wherein the tuner control data is: predetermined tuning values for one or more operational conditions of the electronic device when transmit power is below a predetermined threshold so that antenna tuning is open loop; and closed loop controlled tuning values that start with the predetermined tuning values for the one or more operational conditions of the electronic device when transmit power is above the predetermined threshold.

According to an embodiment of the communications circuit assembly, the tuner control data is predetermined tuning values for the one or more operational conditions of the electronic device when the electronic device is in a receive mode so that antenna tuning is open loop.

According to an embodiment of the communications circuit assembly, the receive mode is a sense mode to ascertain available base stations.

According to an embodiment of the communications circuit assembly, the one or more operational conditions of the electronic device include a current communication band.

According to an embodiment of the communications circuit assembly, the one or more operational conditions of the electronic device further include a state of the electronic device that is indicative of antenna assembly loading.

According to an embodiment of the communications circuit assembly, the closed loop controlled tuning values are bound by a predetermined tuning range for the one or more operational conditions.

According to an embodiment of the communications circuit assembly, the tuner control data is input to a decoder that decodes the tuner control data into control signals for individual components of the tuner.

According to an embodiment of the communications circuit assembly, the individual components of the tuner are micro electro-mechanical system (MEMS) devices.

According to another aspect of the disclosure, a method of tuning an antenna assembly from a communications circuit assembly for an electronic device through which the electronic device establishes wireless communications with a communications network includes operatively coupling a transceiver and the antenna assembly with a tuner; and controlling the tuner by outputting tuner control data with a controller, wherein the tuner control data is: predetermined tuning values for one or more operational conditions of the electronic device when transmit power is below a predetermined threshold so that antenna tuning is open loop; and closed loop controlled tuning values that start with the predetermined tuning values for the one or more operational conditions of the electronic device when transmit power is above the predetermined threshold.

According to an embodiment of the method, the tuner control data is predetermined tuning values for the one or more operational conditions of the electronic device when the electronic device is in a receive mode so that antenna tuning is open loop.

According to an embodiment of the method, the receive mode is a sense mode to ascertain available base stations.

According to an embodiment of the method, the one or more operational conditions of the electronic device include a current communication band.

According to an embodiment of the method, the one or more operational conditions of the electronic device further include a state of the electronic device that is indicative of antenna assembly loading.

According to an embodiment of the method, the closed loop controlled tuning values are bound by a predetermined tuning range for the one or more operational conditions.

According to an embodiment of the method, the tuner control data is input to a decoder that decodes the tuner control data into control signals for individual components of the tuner.

According to an embodiment of the method, the individual components of the tuner are micro electro-mechanical system (MEMS) devices.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1A:
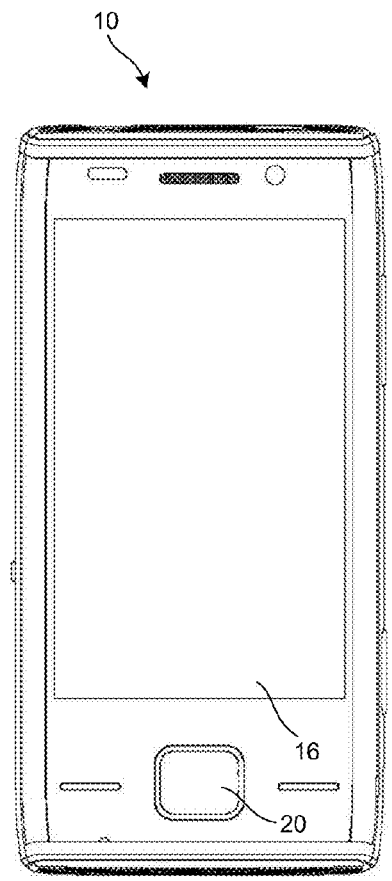
FIG. 1A is a front view of a representative electronic device in the form of a mobile telephone, the mobile telephone being a slider phone in a closed state.

Embodiments will now be described with reference to the drawings, wherein like reference numerals are used to refer to like elements throughout. It will be understood that the figures are not necessarily to scale.

In the present document, embodiments are described primarily in the context of a portable radio communications device, such as the illustrated mobile telephone. It will be appreciated, however, that the exemplary context of a mobile telephone is not the only operational environment in which aspects of the disclosed systems and methods may be used. Therefore, the techniques described in this document may be applied to any type of appropriate electronic device, examples of which include a mobile telephone, a media player, a gaming device, a computer, a pager, a communicator, an electronic organizer, a personal digital assistant (PDA), a portable communication apparatus, etc.

Figure 1B:
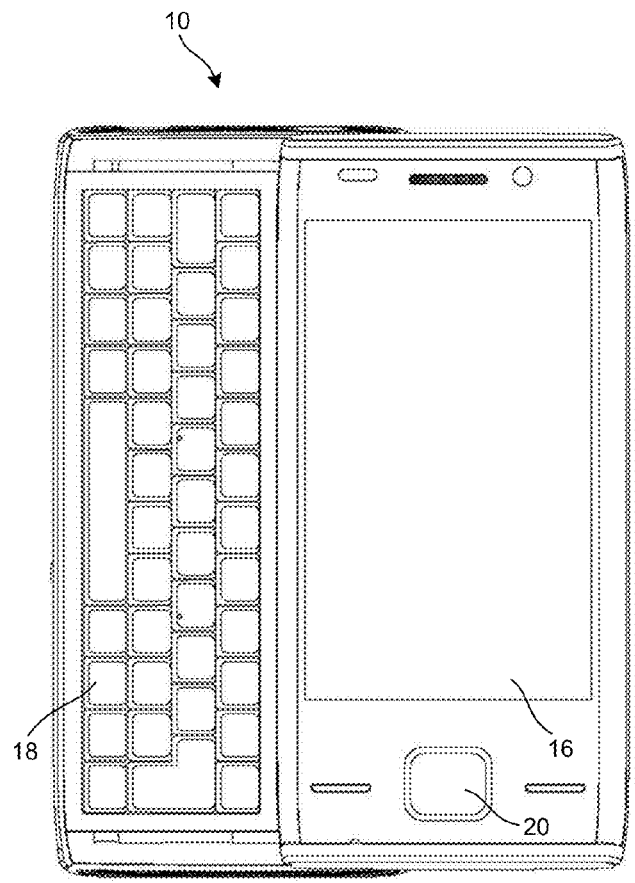
FIG. 1B is a front view of the mobile phone of FIG. 1A in an open state.
Figure 2:
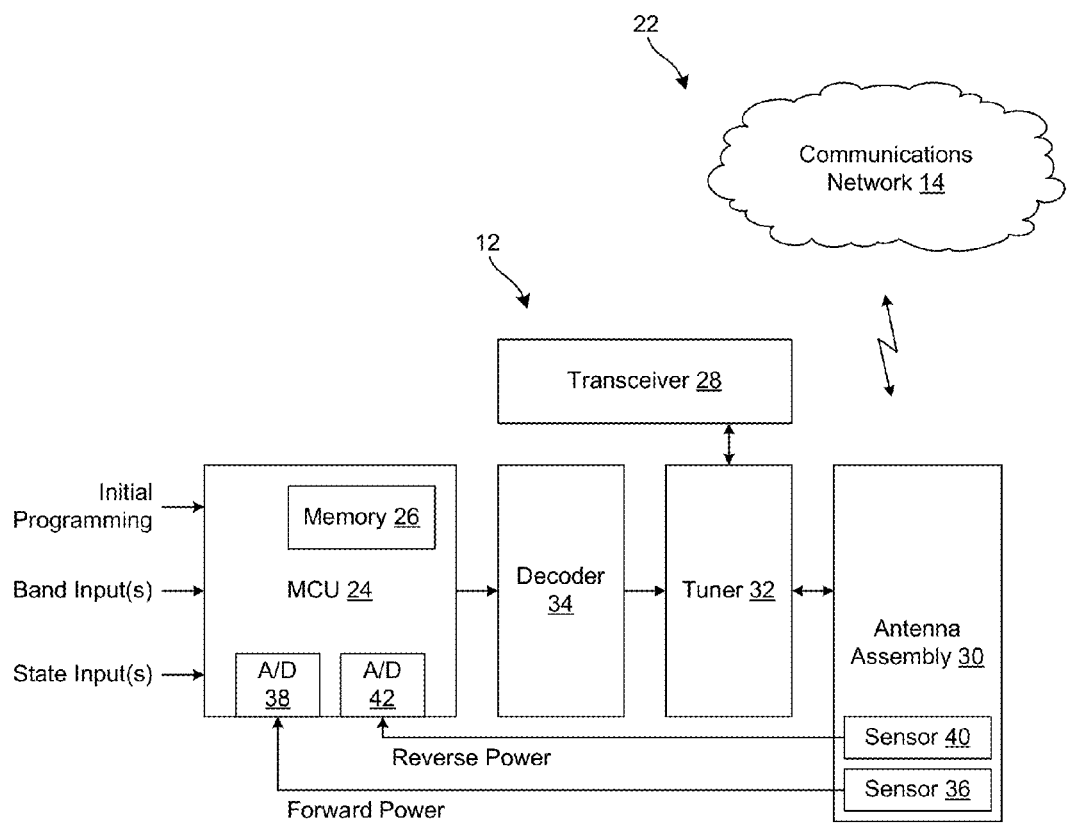
FIG. 2 is a schematic block diagram of an exemplary embodiment of operative communications circuitry of the mobile phone in accordance with various aspects of the disclosure.

Referring initially to FIGS. 1A, 1B and 2, an electronic device 10 is shown. The illustrated electronic device 10 is a mobile telephone that includes communications circuitry 12 that enables the electronic device 10 to establish wireless communications with a communications network 14. As will be described in greater detail, the communications circuitry 12 allows for antenna tuning. The functionality to support antenna tuning may be embodied as executable instructions (e.g., code) that is resident in and executed by the electronic device 10. In one embodiment, the executable instructions may be one or more programs that are stored on a computer readable medium.

Also, through the following description, exemplary techniques for antenna tuning are described. It will be appreciated that through the description of the exemplary techniques, a description of steps that may be carried out in part by executing software is described. Although a computer program listing is omitted for the sake of brevity, the described steps may be considered a method that the corresponding device is configured to carry out. While the described steps are implemented in software in accordance with an embodiment, such functionality could also be carried out via dedicated hardware or firmware, or some combination of hardware, firmware and/or software.

As is typical for an electronic device 10, the electronic device 10 may include a display 16 to display information to a user. A keypad 18, a navigation input 20, and/or touch sensitive functionality of the display 16 may allow for a variety of user input operations.

The electronic device 10 is shown as having a "slider" type form factor where an upper portion of the electronic device 10 may be slid open relative to a lower portion of the electronic device 10. Therefore, the electronic device 10 may have two physical states, including an open state and a closed state. It will be appreciated that the illustration of a slider type form factor is exemplary. Other exemplary form factors include a "brick" or "block" form factor housing that has only one physical state. Another exemplary form factor is a flip-open, or "clamshell," form factor that has an open physical state and a closed physical state. Yet another exemplary form factor may include a pivoting housing component. Combinations of these form factor types may be combined to result in even more possible physical states of the electronic device 10. As will be described, the physical state of the electronic device 10 may be considered during antenna tuning.

As indicated, the electronic device may be configured to operate as part of a mobile communications system 22 when in operative communication with the communications network 14. In the embodiment of the mobile telephone, the communication circuitry 12 may be configured for interaction with a mobile radio network, such as global system for mobile communications (GSM) and/or wideband code division multiple access (WCDMA). Of course, the communications circuitry 12 may support additional or alternative standards, such as general packet radio service (GPRS), WiFi (e.g., a network compatible with IEEE 802.11), WiMAX (e.g., a network compatible with IEEE 802.16), integrated services digital broadcasting (ISDB), high speed packet access (HSPA), or any other appropriate standard. It will be appreciated that the electronic device 10 may be capable of communicating using more than one standard and the illustrated components of the communications circuitry 12 represent the hardware and functionality for each desired standard (e.g., there may be one or more than one radio transceiver and/or antenna as part of the communications circuitry 12).

The communications network 14 may include one or more servers (not illustrated) for managing calls placed by and destined to the electronic device 10, transmitting data to and receiving data from the electronic device 10, and carrying out any other support functions. The server and/or other components of the communications network 14 may communicate with the electronic device 10 via a transmission medium. The transmission medium may be any appropriate device or assembly, including, for example, a communications base station (e.g., a cellular service tower, or "cell" tower), a wireless access point, a satellite, etc. The network 14 may support the communications activity of multiple electronic devices 10 and other types of end user devices. As will be appreciated, servers of the network 14 may be configured as a typical computer system used to carry out server functions and may include a processor configured to execute software containing logical instructions that embody the functions of the server and a memory to store such software. In alternative arrangements, the electronic device 10 may wirelessly communicate directly with another electronic device 10 (e.g., another mobile telephone or a computer) through a local network or without an intervening network.

The communications circuitry 12 enables the electronic device 10 to establish communications with another device. Communications may include calls, data transfers, and the like. Calls may take any suitable form such as, but not limited to, voice calls and video calls. The calls may be carried out over a cellular circuit-switched network or may be in the form of a voice over Internet Protocol (VoIP) call that is established over a packet-switched capability of a cellular network or over an alternative packet-switched network, for example. Data transfers may include, but are not limited to, receiving streaming content (e.g., streaming audio, streaming video, etc.), receiving data feeds (e.g., pushed data, podcasts, really simple syndication (RSS) data feeds), downloading and/or uploading data (e.g., image files, video files, audio files, ring tones, Internet content, etc.), receiving or sending messages (e.g., text messages, instant messages, electronic mail messages, multimedia messages), and so forth. This data may be processed by the electronic device 10, including storing the data in a memory (not shown), executing applications with a processor (not shown) to allow user interaction with the data, displaying video and/or image content associated with the data, outputting audio sounds associated with the data, and so forth.

The electronic device 10 may include a primary control circuit (not shown) that is configured to carry out overall control of the functions and operations of the electronic device 10. The control circuit may include a processing device, such as a central processing unit (CPU), a microcontroller, or a microprocessor. The processing device executes code stored in a memory (not shown) within the control circuit and/or in a separate memory in order to carry out operation of the electronic device 10. For instance, the memory may store executable code that embodies the various antenna tuning control functions and the processing device may execute that code.

In one embodiment, the communication circuitry 12 may include a controller in the form of a processing device, such as the illustrated microcontroller unit (MCU) 24. The MCU 24 may be same as the processing device of the primary control circuit or a separate processing device. In the event that the MCU 24 is separate, the code that implements the antenna tuning control may be stored by a memory 26 of the MCU 24 or in a separate memory. Also, the code may be completely executed by the MCU 24, or executed in part by the MCU 24 and executed in part by the processing device of the primary control circuit.

Memory separate from the MCU 24 and/or the processing device of the primary control circuit may be, for example, one or more of a buffer, a flash memory, a hard drive, a removable media, a volatile memory, a non-volatile memory, a random access memory (RAM), or other suitable device. In a typical arrangement, the memory may include a non-volatile memory for long term data storage and a volatile memory that functions as system memory for the processing device(s). The memory may exchange data with the primary control circuit and/or MCU 24 over a data bus. Accompanying control lines and an address bus also may be present. In one embodiment, the MCU 24 may be configured to communicate with other internal components of the electronic device 10 (e.g., to receive data input) over inter-integrated circuit (12C) communication lines.

The electronic device 10 further includes other components to carry out the various functions of the device. For instance, a sound signal processing circuit (not shown) may be used in conjunction with a speaker (not shown) and a microphone (not shown) for carrying out voice communications and playing audio to a user. A video processing circuit (not shown) may be used to drive the display 16. Input/output (I/O) interface(s) (not shown) may be used electrically connect the electronic device to another device (e.g., a computer), an accessory (e.g., a personal handsfree (PHF) device), and/or a power source.

A camera (not shown) may be present for taking digital pictures and/or movies. Image and/or video files corresponding to the pictures and/or movies may be stored in the memory. A position data receiver (not shown), such as a global positioning system (GPS) receiver, may be involved in determining the location of the electronic device 10. A local transceiver (not shown) may be present to establish communication with a nearby device, such as an accessory (e.g., a PHF device), another mobile radio terminal, a computer or another device. In one embodiment, the local transceiver is separate from the communication circuitry 12. For instance, the local transceiver may be a Bluetooth chipset.

With continuing reference to FIG. 2, the communication circuitry 12 may include a transceiver 28 that is operatively coupled to an antenna assembly 30 through a tuning network, referred to as a tuner 32. The antenna assembly 30 may include one of more antennas and the transceiver 28 may include one or more radio frequency (RF) transmitters and one or more RF receivers. The tuner 32 may be implemented with an array of switchable micro electro-mechanical system (MEMS) capacitors that selectively couple RF lines between the transceiver 28 and the antenna assembly 30 to varying capacitive loads that implement antenna tuning. For instance each MEMS capacitor may have a high capacitance state (e.g., about 10 picofarads, or pF) and a low capacitive state (e.g., about 1 pF). The MEMS capacitors may be arrayed, in parallel and in series, such that their states may be arranged to cover a desired range of impedance transformation and with a desired degree of impedance resolution. In other embodiments, the tuner 32 may include an array of capacitors (e.g., barium strontium titanate (BST) capacitors) and switches that are toggled to achieve a desired capacitance.

The MCU 24 may output tuner control data upon which the MEMS capacitors in the tuner 32 are set. For example, the control data may be input to a decoder 34 that decodes the control data. The control data may be, for example, a 16 bit output from the MCU 24. The control data is decoded by the decoder 34 into individual MEMS capacitor setting (or switch) control signals. It will be appreciated that the arrows representing signal flow in FIG. 2 each may represent one or more data lines. For instance, each bit of control data from the MCU 24 may have a corresponding data line to the decoder 34.

A transmit power sensor 36 may detect transmitted power from the antenna assembly 30. The sensed transmit power, also referred to as forward power, may input to the MCU 24 in the form of an analog DC signal. An analog to digital (A/D) converter 38 of the MCU 24 may convert the forward power signal into a digital value for processing. A reflected power sensor 40 may detect reflected power at the antenna assembly 30. The sensed reflected power, also referred to as reverse power, may be input to the MCU 24 in the form of an analog DC signal. An A/D converter 42 of the MCU 24 may convert the reverse power signal into a digital value for processing.

Figure 3:
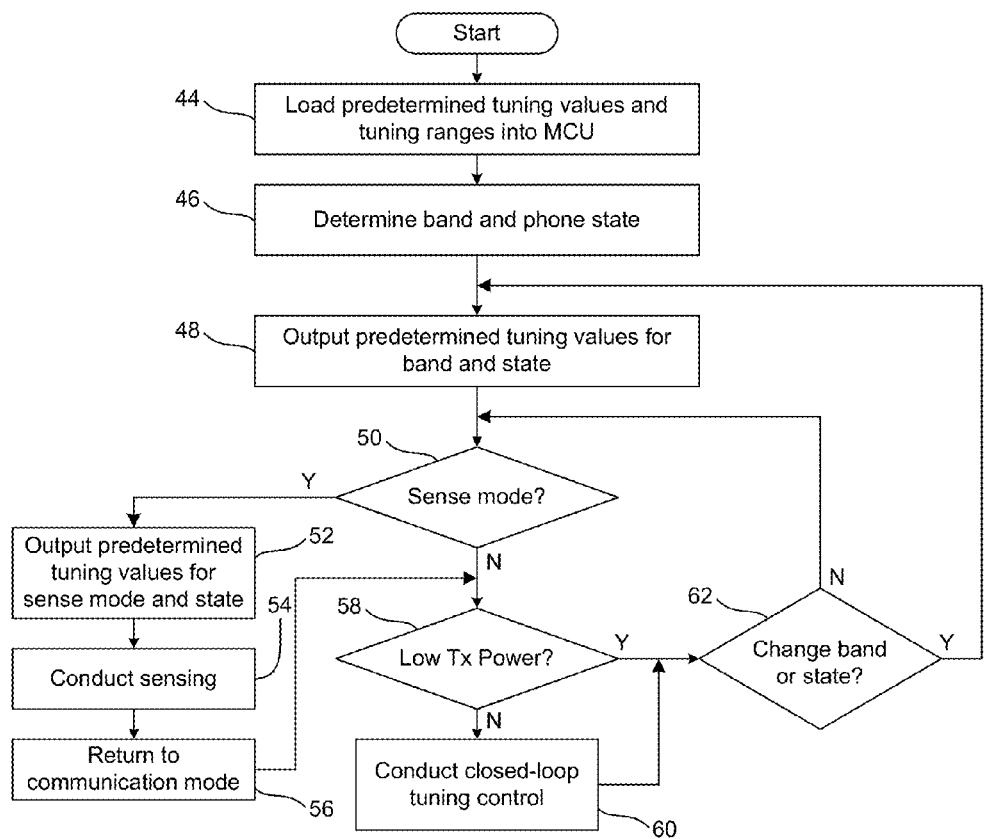
FIG. 3 is a flow chart representing an exemplary method of antenna tuning using the communications circuitry of FIG. 2.

With additional reference to FIG. 3, illustrated are logical operations to implement an exemplary method of tuning the antenna assembly 30. The flow chart of FIG. 3 may be thought of as depicting steps of a method carried out by the electronic device 10. Although FIG. 3 shows a specific order of executing functional logic blocks, the order of executing the blocks may be changed relative to the order shown. Also, two or more blocks shown in succession may be executed concurrently or with partial concurrence. Certain blocks also may be omitted. Although shown as a logical progression, the logical flow of FIG. 3 may be implemented in an object-oriented manner.

The tuning technique for the antenna assembly 30 is implemented to control the tuning in one of closed loop mode or in open loop mode depending on the current operation of the electronic device 10. This hybrid tuning approach is intended to allow for dynamic tuning when appropriate and still provide for open loop stability and performance over the entire dynamic range of the electronic device 10.

The logical flow may start in block 44 where predetermined tuning values and corresponding tuning ranges are loaded into the memory of the MCU 24. The loading of the predetermined data may be made at power-up of the electronic device 10. In one embodiment, the loading of the data may include reading the data from a memory external to the MCU 24 and inputting of the data to the MCU 24 over initial programming lines.

A predetermined set of tuning values and a corresponding tuning range may be loaded for each combination of operating band and phone state. The predetermined tuning values may be in the form of control data that is output by the MCU 24 to the decoder 34. The tuning values and tuning range for each operating band and phone state may be determined by the designer of the electronic device 10 using knowledge of the behavior of the antenna assembly 30. This knowledge may be derived from conducting tests, empirical evaluation, computer modeling, performance data for similar products, and other information sources.

The set of tuning values for a band and phone state combination will establish the tuning of the antenna assembly 30. In addition, the corresponding tuning range will establish an upper bound and a lower bound to the amount of dynamic tuning, thereby establishing a predefined tuning range around tuning established by the set of tuning values.

The band of the electronic device 10 refers to the operational communication band (also referred to as frequency or channel) over which the electronic device 10 is configured to communicate with the communication network at any given time. For instance, GSM bands may include 859 MHz, 900 MHz, 1800 MHz, and 1900 MHz. Similarly, a variety of WCDMA bands are possible. In one embodiment, the working frequency range of the electronic device 10 is about 700 MHZ to about 2.6 GHz.

The state of the electronic device 10 refers to one or more operational modes and/or characteristics of the electronic device 10 at any given time. The states will typically relate to potential loading of the antenna assembly 30, such as by proximity to another component of the electronic device 10 or an external item. As an example, for a slider phone or a clam shell phone, the phone may have an open state and a closed state. As another example, states may be established for proximity of the user's head or hand to the electronic device 10, proximity of another object (e.g., a car seat, a cradle, etc.) to the electronic device, or detection of a free-space type environment. These proximities may be determined using object detection sensors, accelerometers, load sensors, and so forth. Another exemplary state is whether the electronic device 10 is used in a handsfree mode or in a hand held mode.

In one embodiment, a data table or other data structure may be used to store a set of tuning values and a tuning range for each combination of band and state. For example, one entry in the table may specify a set of predetermined tuning values and a tuning range for the conditions where the electronic device 10 being used for a call in the 1900 MHz GSM band, and the slider is open. This arrangement may minimize tuning time and maximize tuning accuracy.

As will be described in greater detail below, the predetermined tuning values may be used for situations where dynamic tuning is not desirable, such as when there is insufficient information to accurately perform closed loop tuning. In these situations, open loop tuning may be employed by setting the antenna tuner 22 with the predetermined tuning values and not changing the tuning. An exemplary situation for using this open loop tuning is when the electronic device 10 is placed in a receive-only sense mode for ascertaining available base stations and corresponding signal strengths. Another exemplary situation for using this open loop tuning is when the transmit output power, as represented by the forward power signal, is below a predetermined threshold to be effectively measured and used with the reflected power level to perform dynamic tuning. For typical mobile telephones, the predetermined threshold for the output power may be about −10 dBm to about 0 dBm. But other values for the predetermined threshold are possible. Preferably, the predetermined threshold is a value below which the forward power sensor 36 and the reversed power sensor 40 do not provide adequate input to conduct closed loop tuning. For instance, sensitivity limits of the sensors 36 and/or 40 may place an effective operational constraint on tuning performance. In these situations, it is difficult to accurately measure reflected transmit power to accurately perform dynamic tuning. Therefore, using predetermined antenna tuning for the band and device state will offer stable antenna tuning performance.

With continuing reference to FIG. 3, following block 44, the logical flow may proceed to block 46 where the band and phone state (or states) may be determined based on band input signals and state input signals that are input to the MCU 24. Next, in block 48, the MCU 24 may output the predetermined tuning values for the band and state that were determined in block 46. As indicated, the tuning values that are output by the MCU 24 to the decoder 34 may be decoded and result in the driving MEMS switches in the tuner 32 to adjust the tuning of the antenna assembly 30.

Next, in block 50, a determination may be made as to whether the electronic device 10 is placed in a receive mode, such as a transition from a communications mode (e.g., for carrying out a call, data transfer, or the like) to a sense mode for determining available base stations. If a positive determination is made in block 50, the logical flow may proceed to block 52. In block 52, tuning values for the sense mode and device state may be output from the MCU 24 and input to the decoder 34. Next, in block 54, the sensing may be performed. Thereafter, the electronic device 10 may be returned to the communications mode in block 56. Part of returning the electronic device 10 to the communications mode may be returning the output tuning values to the values that were used immediately prior to entering the sense mode.

Following block 56 or a negative determination in block 50, the logical flow may proceed to block 58. In block 58, a determination may be made as to whether the transmit power is below the predetermined threshold. If a negative determination is made in block 58 (i.e., there is sufficient transmit power to conduct open loop tuning), the logical flow may proceed to block 60. In block 60, open loop tuning may be conducted. Open loop tuning may be carried out by varying the tuning values that are output by the MCU 24 so as to minimize the reflected transmit power. The reflected transmit power is indicative of any impedance mismatch between the antenna assembly 30 and the transceiver 28. Therefore, it is contemplated that minimizing reflected transmit power, as represented in the reverse power signal, obtains the best possible impedance matching for the antenna assembly 30. During tuning, the MCU 24 may compare the forward and reflect power signals, minimize voltage standing wave radio (VSWR), and optimize power transferred to the antenna assembly 30. As indicated, the open loop tuning may be constrained by the predetermined tuning range that is associated with the current band and device state.

Following block 60 or a positive determination in block 58, the logical flow may proceed to block 62. In block 62, a determination as to whether the band and/or the device state has changed may be made. If so, a positive determination may be made and the logical flow may proceed to block 48 where the predetermined set of tuning values for the new band and/or device state may be output from the MCU 24 to the decoder 34. Thereafter, or upon a negative determination in block 62, the logical flow may return to block 50 to monitor for entry into the sense mode, monitor for whether the transmit power is below the predetermined threshold, and monitor for changes in band and/or device state.

Although certain embodiments have been shown and described, it is understood that equivalents and modifications falling within the scope of the appended claims will occur to others who are skilled in the art upon the reading and understanding of this specification.

What is claimed is:

1. A communications circuit assembly for an electronic device through which the electronic device establishes wireless communications with a communications network, comprising:
   a transceiver;
   an antenna assembly;
   an impedance matching tuner that operatively couples the transceiver and the antenna assembly, the impedance matching tuner has a variable impedance matching configuration to match impedance of the antenna assembly to the transceiver; and
   a controller configured to control the impedance matching tuner by outputting impedance matching tuner control data to the impedance matching tuner, wherein the impedance matching tuner control data is:
      predetermined tuning values for a currently used frequency band and a currently sensed loading condition of the antenna assembly when transmit power is below a predetermined threshold so that the impedance matching configuration of the impedance matching tuner coupling the antenna assembly and the transceiver is open loop; and
      closed loop controlled tuning values that start with the predetermined tuning values for the currently used frequency band and currently sensed loading condition of the antenna assembly when transmit power is above the predetermined threshold so that the impedance matching configuration of the impedance matching tuner coupling the antenna assembly and the transceiver is closed loop.

2. The communications circuit assembly of claim 1, wherein the impedance matching tuner control data is predetermined tuning values for the currently used frequency band and currently sensed loading condition of the antenna assembly when the electronic device is in a receive mode so that the impedance matching configuration of the impedance matching tuner coupling the antenna assembly and the transceiver is open loop.

3. The communications circuit assembly of claim 2, wherein the receive mode is a sense mode to ascertain available base stations.

4. The communications circuit assembly of claim 1, wherein the closed loop controlled tuning values are bound by a predetermined tuning range for the currently used frequency band and currently sensed loading condition of the antenna assembly.

5. The communications circuit assembly of claim 1, wherein the impedance matching tuner control data is input to a decoder that decodes the impedance matching tuner control data into control signals for individual components of the impedance matching tuner.

6. The communications circuit assembly of claim 5, wherein the individual components of the impedance matching tuner are micro electro-mechanical system (MEMS) devices.

7. A method of tuning an antenna assembly from a communications circuit assembly for an electronic device through which the electronic device establishes wireless communications with a communications network, comprising:
   operatively coupling a transceiver and the antenna assembly with a impedance matching tuner, the impedance matching tuner having a variable impedance matching configuration to match impedance of the antenna assembly to the transceiver; and
   controlling the impedance matching tuner by outputting impedance matching tuner control data with a controller, wherein the impedance matching tuner control data is:
      predetermined tuning values for a currently used frequency band and a currently sensed loading condition of the antenna assembly when transmit power is below a predetermined threshold so that the impedance matching configuration of the impedance matching tuner coupling the antenna assembly and the transceiver is open loop; and
      closed loop controlled tuning values that start with the predetermined tuning values for the currently used frequency band and currently sensed loading condition of the antenna assembly when transmit power is above the predetermined threshold so that the impedance matching configuration of the impedance matching tuner coupling the antenna assembly and the transceiver is closed loop.

8. The method of claim 7, wherein the impedance matching tuner control data is predetermined tuning values for the currently used frequency band and currently sensed loading condition of the antenna assembly when the electronic device is in a receive mode so that the impedance matching configuration of the impedance matching tuner coupling the antenna assembly and the transceiver is open loop.

9. The method of claim 8, wherein the receive mode is a sense mode to ascertain available base stations.

10. The method of claim 7, wherein the closed loop controlled tuning values are bound by a predetermined tuning range for the currently used frequency band and currently sensed loading condition of the antenna assembly.

11. The method of claim 7, wherein the impedance matching tuner control data is input to a decoder that decodes the impedance matching tuner control data into control signals for individual components of the impedance matching tuner.

12. The method of claim 11, wherein the individual components of the impedance matching tuner are micro electro-mechanical system (MEMS) devices.

* * * * *